United States Patent [19]

Hamerdinger et al.

[11] 4,149,779

[45] Apr. 17, 1979

[54] INTERNAL LASER MIRROR ALIGNMENT FIXTURE

[75] Inventors: Randolph W. Hamerdinger; Robert C. McQuillan, both of Glendora, Calif.

[73] Assignee: Xerox Corporation, Stamford, Conn.

[21] Appl. No.: 850,314

[22] Filed: Nov. 10, 1977

[51] Int. Cl.² .............................................. G02B 7/18
[52] U.S. Cl. ................................ 350/310; 331/94.5 C
[58] Field of Search ............................. 350/310, 288; 331/94.5 D, 94.5 C

[56] References Cited

U.S. PATENT DOCUMENTS

| 3,478,608 | 11/1969 | Met .................................... 350/310 |
| 3,775,700 | 11/1973 | Garman et al. ..................... 350/288 |
| 3,826,998 | 7/1974 | Kindl et al. ...................... 331/94.5 D |
| 3,887,883 | 6/1975 | Garman ........................... 331/94.5 D |

Primary Examiner—Jon W. Henry
Attorney, Agent, or Firm—Irving Keschner; Franklyn C. Weiss

[57] ABSTRACT

A laser tube mirror alignment fixture for use in adjusting the reflecting mirrors on the ends of a laser tube. The fixture consists of two flange members which, when welded, form a single convection bellows, and a backing ring in which a number of screws are placed to provide for adjustment of the reflecting mirrors. The laser reflector is sealed to one of the flanges. The displacement is achieved by adjusting the screws on the backing ring and creating a differential pressure on the back flange of the bellows which, after adjusting the screws, can be locked tight to ensure no further movement.

10 Claims, 4 Drawing Figures

INTERNAL LASER MIRROR ALIGNMENT FIXTURE

BACKGROUND OF THE INVENTION

In application Ser. No. 552,396, which was filed on Feb. 24, 1975 by the present inventors, and assigned to the same assignee, now U.S. Pat. No. 3,904,986 a laser tube end assembly is disclosed, said assembly comprising a laser mirror sealed to each end of the laser tube, the seal withstanding the relatively high temperatures utilized to remove the contaminents from the laser tube during fabrication thereof. This patent application is hereby incorporated by reference for all the teachings therein which relate to the present application in order to fulfill adequacy of disclosure.

The mirrors on the ends of a laser tube, whether forming part of the laser tube itself, are internally mounted mirrors, or are externally mounted mirrors, must be accurately aligned with each other to allow the reflection necessary for the lasing action to be most efficient. Because of the many stresses that a laser tube is put during the manufacturing thereof; that is, the various heating, and evacuation steps, could cause small but definite changes in the tube configuration which would change whatever preinstallation assembly made for the alignment of the mirrors. Even if the mirrors are adjusted, if they are adjustable at all, after the laser tube is completely assembled, the hazards of shipping lasers from one point to another, including all the various vibrations and bumps even with modern delivery techniques, the mirrors may get out of alignment.

Therefore, the need exists for a laser mirror assembly wherein the end assembly is adjustable to allow the mirror, or mirrors, to be fully adjustable within a fairly broad range of adjustment so that the laser can both be aligned at manufacture for testing purposes and can again be realigned in the field, if necessary, in the equipment in which the lasers are to be utilized, at a later date.

SUMMARY OF THE PRESENT INVENTION

The present invention provides a laser tube end assembly which comprises a laser mirror sealed to each end of a laser tube, with the laser mirror being fully adjustable subsequent to the time the laser is completely assembled. As set forth in the copending application identified above, the mirror is attached to an apertured, recessed metal flange member by a slurry, comprising a glass frit and a carrier. This first metal flange would be attached to a second flange member which would be actually attached to the glass or envelope part of the tube. A ring member attached to the second flange member would have spaced screws passing through the ring to contact the second flange member to cause deflection of the flange member by the adjustment of the screws. The deformation of the flange members would, therefore, have a concomitant effect of moving the mirror and thus influencing the laser alignment.

OBJECTS OF THE PRESENT INVENTION

It is, therefore, an object of the present invention to provide apparatus for adjusting the optical mirrors on the ends of a laser tube.

It is a further object of the present invention to provide a method and apparatus for adjusting the reflecting optical mirrors on the ends of a laser tube subsequent to the manufacture and assembly of the laser tube.

It is still another object of the present invention to provide an adjustable laser tube mirror end assembly, one of which is joined to each end of the laser tube the laser assemblies being manually adjustable within a range to allow optical alignment of one mirror to the other mirror on the other end of the laser tube to allow maximum, reflection and transmission of the light generated by the laser tube itself.

DESCRIPTION OF THE DRAWINGS

For a more complete understanding of the invention, as well as other objects and further features thereof, reference may be had to the following detailed description of the invention in conjunction with the drawings wherein.

DETAILED DESCRIPTION OF THE INVENTION

Figure 1:
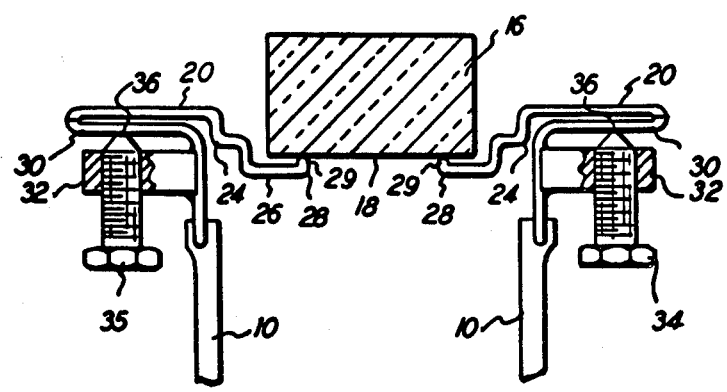
FIG. 1 is a cross-section of the laser tube mirror alignment fixture in its essentially unadjusted configuration.

As set forth in application Ser. No. 552,396, now U.S. Pat. No. 3,904,986 identified above, the laser tube may comprise a continuous wave gas laser oscillator, such as a helium-neon gas laser or a gas metal vapor laser, such as a helium-cadmium metal vapor laser. FIG. 1 of the present application shows a cross-sectional view of the end of the laser tube, the other end of the laser tube being similar, but not shown. The only difference between one end of the laser and the other end of the laser and the assemblies shown are the fact that one of the reflecting surfaces would be totally reflecting while the reflecting surface at the other end of the tube would be partially reflecting to allow the laser tube light to escape for whatever particular purpose the laser is being put to. For the purposes of this invention, however, it does not matter whether the reflective surface is total or partially transparent.

FIG. 1 of the present application shows, in partial sections, the envelope 10 of the laser tube which, as set forth in the above mentioned copending Patent Application, could be made of glass, quartz, ceramic or metal and includes the pair of integral mirror assemblies, one at each end of the tube. Bonded to envelope 10 is flange 30. This flange 30 would be essentially tulip shaped whereby the smaller diameter is bonded to the envelope 10 and gradually increases in diameter until the maximum dimension is reached. FIG. 1 shows, however, that the dimension of member 30 in its smallest diameter remains constant for most of the extension of the flange and then rapidly increases in diameter to the outer point of the flange. The flange 30 may be attached to the envelope 10 by any of the known metal to glass, ceramic, etc., techniques well known in the art.

Flange member 20, in FIG. 1, comprises an apertured, recessed cup shaped metal flange member 20 with the concave surface thereof facing away along the axis of the laser tube. Member 20 is a disk shaped metal member having a series of internal, concentric stepped like portions 24 and 26 of decreasing diameter. At the innermost portion of the flange member 20, corresponding to step 26, is an aperture 28. At the aperture 28 is a lip 29 upon which the reflecting substrate 16 rests and is sealed thereto. The method of sealing is fully disclosed in the copending application set forth above. In FIG. 1, for example, the substrate 16 rests on the outer edge of lip 29, external to the laser tube, with only the reflecting layer 18 being in direct contact with the gaseous or internal material of the laser tube 10. Flange 20 may be welded, or otherwise attached, to flange 30, at their outermost diameter, as long as the seal is complete.

Attached to flange member 30, at the portion thereof wherein the diameter is essentially constant, is ring 32. This ring may be attached to flange 30 in any of the known manners such as welding, spot welding, or soldering, as necessary. Along the periphery, or internal circumference of ring 32 would be a plurality of screw holes drilled or otherwise formed in the ring at predetermined positions around the circumference of the ring 32. The axis of the screw holes would be parallel to the axis of the ring and the tube itself. In FIG. 1, two such holes are shown but these are exemplary only as two or more may be used for fine tuning of the adjustment procedure. Inserted in the various drilled holes would be adjusting screws 34 and 35 which come into contact with the flange 30 at points 36. As can be seen in FIG. 1, after the adjusting screw 34 reaches or contacts flange 30 at point 36, further turning of the adjusting screw will begin to deform flange 30 and thus flange 20. In a similar manner, all the adjusting screws located around the periphery of ring 32 and thus flange 30 can be similarly adjusted so as to deform flange 30 and flange 20.

Figure 2:
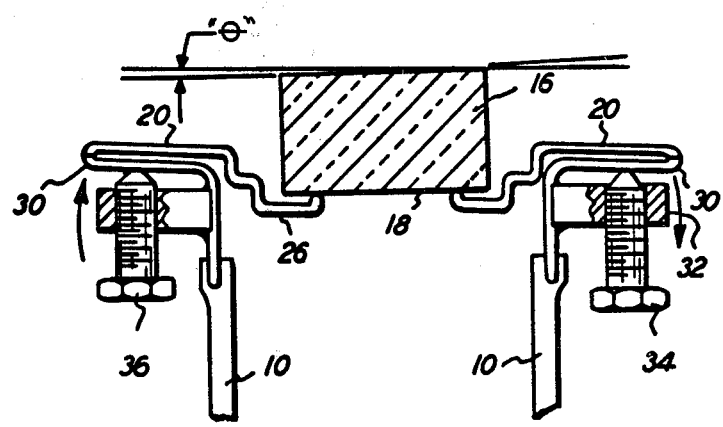
FIG. 2 is the mirror alignment fixture as shown in FIG. 1 but now adjusted in accordance with the teachings of the present invention.

Referring now to FIG. 2, it can be seen that if adjusting screw 35 is adjusted in the outer direction from the laser tube while adjusting screw 34 is adjusted into or along the axis parallel to that of the tube, flange 30 is deformed and since flange 20 is coupled to flange 30, it also is deformed. Depending on the amount of deformation needed and to allow for permanent deformation, i.e., adjuctment, the screws can be adjusted along the periphery of ring 32 to allow for the required deformation. As seen in FIG. 1, the surface substrate 16 and thus reflecting layer 18 is, therefore, adjusted to whatever position is necessary to obtain the necessary laser output light desired. Seen in FIG. 2 is the adjusting angle "$\theta$" as representative of the desired angle change.

By adjusting the various screws around ring 32, the flanges 30 and 20 and thus substrate 16 can be adjusted to the desired angle notwithstanding the angle to which the substrate 16 found itself subsequent to the manufacture and assembly of the laser tube itself.

Figure 3:
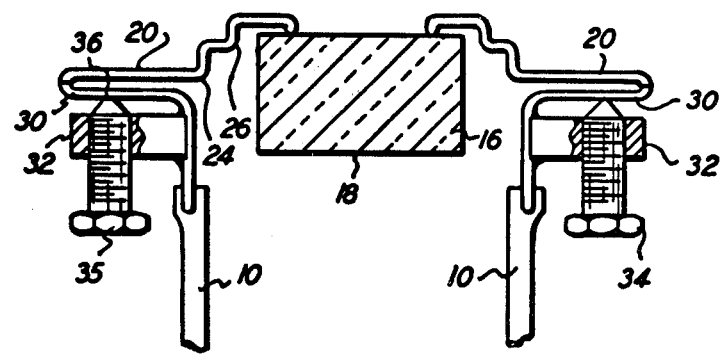
FIG. 3 is similar to the mirror alignment fixture as set forth in FIG. 1 but the reflecting substrate is mounted now on the inside of the adjustable flange.

FIG. 3 is similar to the alignment fixture as seen in FIG. 1 except for the fact that flange 20 is now shown in the reverse position with the recessed cup shape, i.e., the concave surface, facing into rather than out of the tube as seen in FIG. 1. Further, the substrate 16 is now completely internal to the laser tube with the reflecting surface 18 completely inside the tube. The method for mounting the substrate 16 to the flange member 20 does not change and is fully described in the aforementioned copending application. The operation of the fixture in FIG. 3 is exactly the same as that shown in FIG. 1. That is, if screw 35 is adjusted outwardly along an axis parallel to that of the laser tube and screw 34 is adjusted inwardly along the axis of the laser tube then the substrate 16 will, of necessity, be adjusted similar to that as shown in FIG. 2. Obviously, however, any of the adjustments made in FIG. 1 through FIG. 4 can be in either of the directions into or out of the laser tube along the parallel axis thereof and the fine adjustments can be made by the plurality of said screws along the outward periphery of ring 32.

Figure 4:
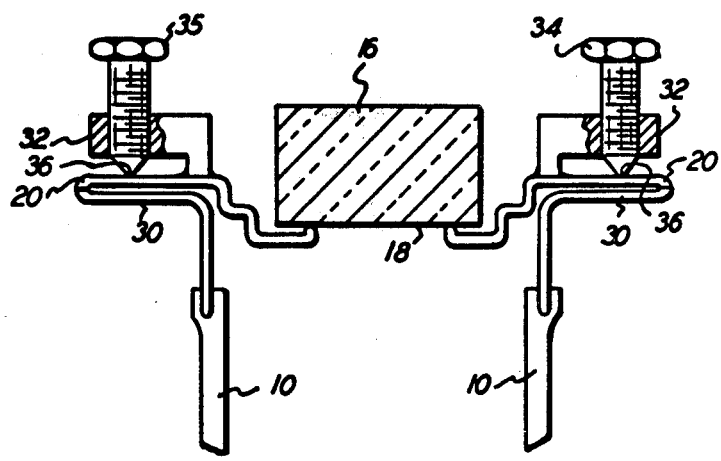
FIG. 4 is similar to the mirror alignment fixture set forth in FIG. 1 but now the adjusting screws are on the outer edge of the adjustable flange rather than the inner edge thereof.

FIG. 4 discloses the adjustment fixture as seen in FIG. 1 except that now the ring 32 has a slightly different configuration and is no longer attached to flange 30 along the essentially constant diameter part of the flange which attach to the laser envelope 10. Ring 32 now has a vertical projection at the aperture of the ring which is soldered or welded or attached by any other means to flange 20 now instead of flange 30. Screws 34 and 35 operate in a similar manner and are positioned along the periphery of ring 32 as occurred in FIGS. 1 through 3. Thus, adjusting screw 35 outwardly along the parallel axis to the laser tube and adjusting screw 34 inwardly along the axis of the laser tube, the substrate 16 can be adjusted to the same angle $\theta$ as seen in FIG. 2.

For a full disclosure of the method and manufacture of the various flanges and attachment of the substrate thereto by the means of the glass frit and slurry, and also the composition of the various components thereof, reference is made to the incorporated copending patent application. However, for purposes of example in the particular application, the following are the typical compositions of the various substrates. It is, of course, desired that the various members having closely matched thermal coefficients of expansion and also retain their mechanical dimensions during and after thermal cycling. If, for example, substrate 16 is comprised of Schott K5 glass, and the glass frit and slurry is utilized at the point of attachment of substrate 16 to lip 29, the slurry would comprise corning pyroceram 89; the flange 20 would comprise Carpenter 49 metal while, for example, ring 32 would comprise Kovar, which is Westinghouse designation for a nickel-iron-cobalt alloy. With these particular compositions, the glass substrate 10 would comprise 7052 type glass. In addition, the various flanges and rings are described as separate, but it is possible, of course, to fabricate them as 1 or more unified pieces.

It should be noted that similar reference numerals have been utilized in each figure to identify similar elements. While the invention has been described with reference to specific embodiments, it will be understood by those skilled in the art that various changes may be made and equivalents may be substituted for elements thereof without departing from the true spirit and scope of the invention. In addition, many modifications may be made to adapt to a particular situation without departing from the essential teachings of the invention.

What is claimed is:

1. A laser tube mirror alignment fixture comprising: mounting means for supporting said mirror, said mounting means comprising metal flange means having an aperture formed therein upon which said mirror has been bonded thereto at said aperture, said metal flange means comprising a first circular, apertured, recessed, cup shaped, metal flange member, said first flange member and the mirror surface being substantially perpendicular to the axis of said laser tube, a second circular, flared, apertured flange member, said second flange member having a portion of constant internal diameter and extending to a maximum diameter, said first and second flange members being connected to one another at approximately their maximum diameters, and means coupled to said mounting means for imparting differential mechanical pressure thereto, said pressure being variable to allow adjustable alignment of said mirror, said means for imparting differential pressure comprising metal ring means connected to said metal flange means, said metal ring means and said metal flange means having their apertures aligned, and, further, said metal ring means having a plurality of screw adjustment means along the periphery thereof, said screw adjustment means having their axis of movement substantially parallel to the axis of said laser tube.

2. The laser tube mirror adjustment fixture as set forth in claim 1 wherein the cup shape of said first flange member faces outwardly of said laser tube, said mirror being mounted external of said laser tube with the mirror surface being bonded to said first flange member.

3. The laser tube mirror adjustment fixture as set forth in claim 2 wherein said metal ring means is connected to said second flange member at a point along the nearly constant diameter portion thereof and the increasing diameter portion of the second flange member is larger in its largest diameter than that of the metal ring means so that the plurality of screw adjustment means will act to apply pressure to said second flange member, which, by means of its connection to said first flange member, exerts adjustable alignment to said mirror.

4. The laser tube mirror adjustment fixture as set forth in claim 1 wherein the cup shape of said first flange member faces inwardly of said laser tube, said mirror being mounted internally of said laser tube with the non-mirror surface being bonded to said first flange member.

5. The laser tube mirror adjustment fixture as set forth in claim 1 wherein said metal ring means is connected to said second flange member at a point along the nearly constant diameter portion thereof and the increasing diameter portion of the second flange member is as large or larger in its largest diameter than that of the metal ring means so that the plurality of the screw adjustment means will act to apply pressure to said second flange member, which, by means of its connection to said first flange member, exerts adjustable alignment to said mirror.

6. The laser tube mirror adjustment fixture as set forth in claim 2 wherein said metal ring means includes a perpendicular section of constant diameter, said perpendicular section being connected to said first flange member so that the plurality of screw adjustment means will act to apply pressure to said first flange member, which by means of its connection to said second flange member exerts adjustable alignment of said mirror.

7. A laser tube mirror alignment fixture comprising:

mounting means for supporting said mirror, said mounting means comprising metal flange means having an aperture formed therein upon which said mirror has been bonded thereto at said aperture, said mirror being bonded to said metal flange means by a bonding material comprising glass frit, said metal flange means comprising a first apertured, recessed metal flange member, said first flange member and the mirror surface being substantially perpendicular to the axis of said laser tube, apertured flange means adjacent said first flange member, said apertured flange means being bonded to the end of said laser tube, said first flange member and said flange means being coupled to one another, and means for imparting differential mechanical pressure to said mounting means, said pressure being variable to allow adjustable alignment of said mirror.

8. The laser tube mirror alignment fixture as set forth in claim 7 wherein said means for imparting differential pressure comprises:

metal ring means connected to said metal flange means, said metal flange means having their apertures aligned, and, further, said metal ring means having a plurality of screw adjustment means along the periphery thereof, said screw adjustment means having their axis of movement substantially parallel to the axis of said laser tube.

9. The laser tube mirror adjustment fixture as set forth in claim 7 wherein said recess of said first flange member faces outwardly of said laser tube, said mirror being mounted external of said laser tube with the mirror surface being bonded to said first flange member.

10. The laser tube mirror adjustment fixture as set forth in claim 7 wherein said recess of said first flange member faces inwardly of said laser tube, said mirror being mounted internally of said laser tube with the non-mirror surface being bonded to said first flange member.

* * * * *

UNITED STATES PATENT AND TRADEMARK OFFICE
CERTIFICATE OF CORRECTION

PATENT NO. : 4,149,779
DATED : April 17, 1979
INVENTOR(S) : Randolph W. Hamerdinger et al It is certified that error appears in the above–identified patent and that said Letters Patent are hereby corrected as shown below:

Column 1, line 8, delete "now U.S. Patent No. 3,904,986".

Column 2, lines 31-32, delete ", now U.S. Patent No. 3,904,986".

Signed and Sealed this

Second Day of October 1979

[SEAL]

Attest:

RUTH C. MASON
Attesting Officer

LUTRELLE F. PARKER
Acting Commissioner of Patents and Trademarks